(12) United States Patent
Sugita et al.

(10) Patent No.: US 6,443,623 B2
(45) Date of Patent: Sep. 3, 2002

(54) LUBRICATION SYSTEM FOR ROLLING BEARING

(75) Inventors: Sumio Sugita; Yu Koiwa; Tamotsu Misawa, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 26 days.

(21) Appl. No.: 09/767,688

(22) Filed: Jan. 24, 2001

(30) Foreign Application Priority Data

Jan. 26, 2000 (JP) .......................... 2000-016683

(51) Int. Cl.[7] .............................................. F16C 33/66
(52) U.S. Cl. ..................... 384/466; 384/465; 384/474
(58) Field of Search ................................ 384/462, 465, 384/466, 468, 473, 474

(56) References Cited

U.S. PATENT DOCUMENTS

| | | | |
|---|---|---|---|
| 4,342,489 A | * 8/1982 | Lenz et al. | 184/6.11 |
| 4,759,427 A | * 7/1988 | Onose et al. | 384/466 |
| 6,176,349 B1 | 1/2001 | Kishi | 184/55.1 |
| 6,328,478 B1 | * 12/2001 | Fukuda et al. | 384/475 |

FOREIGN PATENT DOCUMENTS

| | | | |
|---|---|---|---|
| JP | 3-144117 | * | 6/1991 |
| JP | 6-235425 | | 8/1994 |
| JP | 6-264934 | | 9/1994 |
| JP | 10-231843 | | 9/1998 |
| JP | 2000-120705 | | 4/2000 |

OTHER PUBLICATIONS

NTN Brochure "Noiseless Angular Contact Ball Bearing with Air–oil Lubrication" 10/00.
NTN Brochure "Ceramic Ball Bearings with Outer Ring Nozzle Hole" No date.

* cited by examiner

*Primary Examiner*—Thomas R. Hannon
(74) *Attorney, Agent, or Firm*—Crowell & Moring LLP

(57) ABSTRACT

A lubrication system for a rolling bearing comprised of, an inner ring fitted on a shaft rotating at high speed inside a housing, on the outer peripheral surface of which an inner ring raceway is formed; an outer ring fitted into the housing, on the inner peripheral surface of which an outer ring raceway is formed; an outer ring spacer fitted into and supported by the housing adjacent to the outer ring and having a lubrication oil path; and a plurality of rolling elements provided between the inner ring race ay and the outes ring raceway; wherein the lubrication oil is supplied through the lubrication oil path in the outer ring spacer into a space where a plurality of the rolling elements are provided between an outer peripheral surface of the inner ring and an inner peripheral surface of the outer ring, wherein any portion where the sloping direction and/or sloping angle suddenly changes does not exist from the smaller diameter end, to the larger diameter end adjacent to the inner ring raceway.

10 Claims, 5 Drawing Sheets

US 6,443,623 B2

LUBRICATION SYSTEM FOR ROLLING BEARING

FIELD OF THE INVENTION

The present invention is related to a rolling bearing for the purpose of supporting a shaft rotating at a high speed, such as the main shaft of machine tools, and specifically to a lubrication system used for the rolling bearing to lubricate the rolling bearing.

DESCRIPTION OF THE PRIOR ART

The main shaft of machine tools rotates at a high speed during use. Accordingly, the main shaft like this needs to be rotatably supported by a rolling bearing and, during rotating, be supplied with an enough amount of lubrication oil into the rolling bearing. A device for the purpose of supplying the lubrication oil to a rolling bearing which is used to rotatably support the main shaft inside the housing, Japanese Patent Publication No. Toku Kai Hei 10-299784 discloses a lubrication system for a rolling bearing, which has a structure as shown in FIG. 5. The rolling bearing 1 in this Publication is provided with an inner ring 4 which has an inner ring raceway 5 on its outer peripheral sutrface and is fitted on and fixed by the main shaft (not shown) rotating at a high speed during use. And, the rolling bearing 1 is provided with an outer ring 6 which has an outer ring raceway 7 on its inner peripheral surface and is fitted into and fixed by the housing (not shown). And, a plurality of rolling elements 8 are rotatably supported by a retainer 9 between the inner ring raceway 5 and the outer ring raceway 7.

And, adjacent to the inner ring 4 around the main shaft, first and the second inner ring spacers 10, 11 are provided sequentially from the side of the inner ring 4. On the other hand, inside the housing, adjacent to the outer ring 6, an outer ring spacer 2 is provided. The lubrication system for the rolling bearing is constructed to freely supply the lubrication oil through a lubrication oil path 3 provided in the outer ring spacer 2.

Specifically, the lubrication oil path 3 is provided inside the outer ring spacer 2, and the lubrication oil (oil air or oil mist) supplied into the lubrication oil path 3 is freely supplied into the space 15 between the outer peripheral surface of the inner ring 4 and the inner peripheral surface of the outer ring 6, where the plurality of rolling elements 8 are provided. That is to say, a nozzle hole 13 is provided at the outer ring spacer 2, and the lubrication oil supplied into the lubrication oil path 3 is spouted from the nozzle hole 13. There is an oil supplying gap 14 provided between the inner peripheral surface of the outer ring spacer 2 and the outer peripheral surface of the inner ring spacer 10, and the lubrication oil spouted from the nozzle hole 13 is disgorged from the end opening of the oil supplying gap 14 into the space 15 within the rolling bearing I where the rolling elements 8 are provided. The end opening of the oil supplying gap 14 exists on the radially inner side of the axially medium portion of the inner peripheral surface of the outer ring 6 in the rolling bearing 1. Accordingly, when rotating at a high speed, the lubrication oil, without being affected by the air curtain formed at both end openings of the space 15, is efficiently attached to the rolling surface of each of the rolling elements 8.

In the case of the conventional lubrication system of the rolling bearing constructed and acting as mentioned above, the lubrication of the rolling bearing 1 is good, but it is hard to highly increase the rotating speed of the main shaft. The reason of this problem is mentioned next. For the purpose of highly increasing the rotating speed of the main shaft supported by the rolling bearing 1, the pitch circle diameter (PCD) of the rolling bearing 1 needs to be small.

On the other hand, in the case of the conventional structure as shown in FIG. 5, a part of the outer ring spacer 2 is positioned on the radially inner side of the outer ring 6 and the retainer 9, and then the respective inner diameter of the outer ring 6 and the retainer 9 is not able to be reduced and the PCD is not be ablc to be reduced. Accordingly, as mentioned above, it is difficult to highly increase the speed of the main shaft. And, because of the structure wherein the outer ring spacer 2 is projected into the radially inner side of the retainer 9, the operation of manufacturing the outer ring spacer 2 is troublesome to cause its cost.

Another lubrication system of the rolling bearing for rotatably supporting the main shaft of the machine tools is disclosed, for examples, in Japanese Patent Publication No. Toku Kai Hei 06-264934 and No. Toku Kai Hei 10-231843, but has the similar problems.

Further, the lubrication system of the rolling bearing disclosed in Japanese Patent Publication No. Toku Kai Hei 06-235425, as shown in FIG. 6, is constructed to have a hollow first inner ring spacer 23 between the inner ring 4 and the second inner ring spacer 11 such that part of the hollow inner ring spacer 23 is positioned on the radially inner side of the retainer 9 and the lubrication oil supplied from the outer ring spacer 2b into the inner ring spacer 23 is disgorged from a nozzle hole 13a provided in the inner ring spacer 23 to the rolling surface of rolling elements 8. In the case of this conventional system, because the inner ring spacer 23 used has a larger outer diameter than the inner ring raceway 5, not only PCD is hard to be sufficiently decreased, but also the structure material complexity and the cost increase can not be avoided.

SUMMARY OF THE INVENTION

The present invention is developed for realizing a lubrication system for the rolling bearing, solving all of the above problems.

An object of the present invention is to provide a lubrication system for the rolling bearing having a guide slope surface tilted with respect to the rotation axis and having no portion such as step, oil ditch, edge where the sloping direction and/or sloping angle suddenly change.

BRIEF DESCRIPTION OF THE INVENTION

DETAILED DESCRIPTION OF THE PREFERABLE EMBODIMENTS

Figure 1:
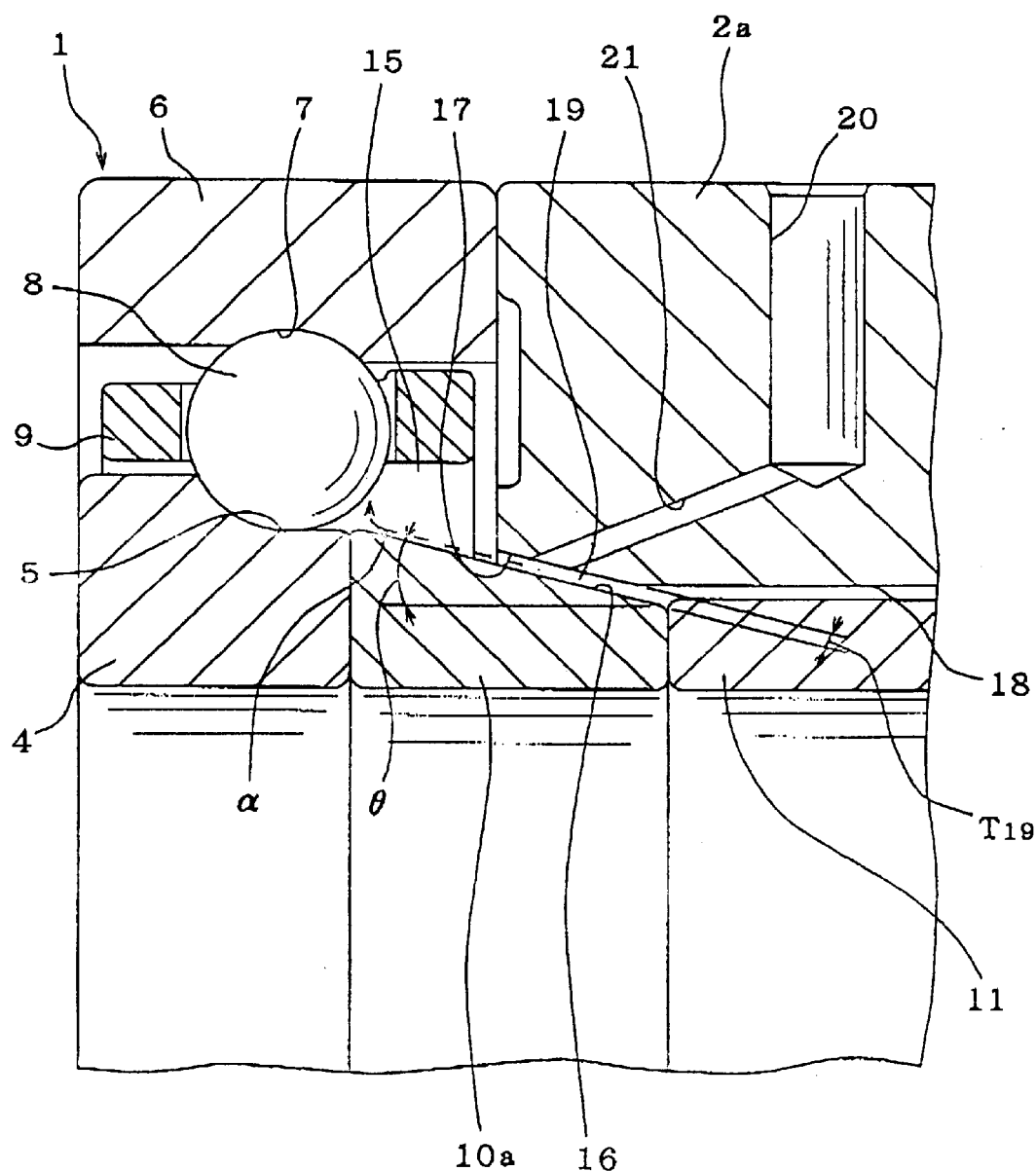
FIG. 1 is a cross sectional view of part of the rolling bearing to which an example of the embodiment of the present invention is applied.

The lubrication system for the rolling bearing in the present invention is comprised of, like the lubrication system of the rolling bearing known in the prior art, an inner ring fitted on and supported by a shaft rotating at high speed inside a housing, on the outer peripheral surface of which an inner ring raceway is provided, an outer ring fitted to and supported by the housing, on the inner peripheral surface of which an outer ring raceway is provided, an outer ring spacer fitted into and supported by the housing adjacent to the outer ring, and a plurality of rolling elements provided between the inner ring raceway and the outer ring raceway, wherein the lubrication oil is supplied through the lubrication oil path provided at the outer ring spacer into a space where a plurality of the rolling elements are provided between the outer peripheral surface of the inner ring and the inner peripheral surface of the outer ring.

Specially, in the lubrication system of the rolling bearing in the present invention, there is an inner ring spacer provided adjacent to the inner ring and fitted on and supported by the shaft, and a guide slope surface is provided on the outer peripheral surface of the inner ring or of the inner ring spacer. And, the guide slope surface is tilted in a direction such that the diameter is decreased as it is separated from the inner ring raceway, and its smaller diameter end is projected in the axially outer direction than the end surface of the outer ring to enter into the radially inner side of the outer ring spacer. And, from the smaller diameter end, to the larger diameter end adjacent to the inner ring raceway, any portion where the sloping direction and/or sloping angle suddenly changes does not exist. And, between the inner peripheral surface of the end of the outer ring spacer and the guide slope surface, an oil supplying gap exists where the lubrication oil freely flows. Further, on the inner peripheral surface of the outer ring spacer, a nozzle hole opens to spout the lubrication oil, supplied through the lubrication oil path, into the guide slope surface.

The function of the lubrication system for the rolling bearing of the present invention as constructed above, is explained below. While the shaft is rotating, the lubrication oil supplied into the lubrication oil path in the outer ring spacer is spouted from the nozzle hole, and attached to the guide slope surface provided on the outer peripheral surface of the inner ring or of the inner ring spacer. Thus, the lubrication oil attached to the guide slope surface is, based on the balance between the centrifugal force due to the rotation of the inner ring or inner ring spacer fitted outside the shaft and the surface tension, supplied along the guide slope surface to the large diameter end, and into the rolling bearing. Then, it is blown away in the radially outer direction by the centrifugal force from the larger diameter end of this guide slope surface and attached to the rolling surface of the rolling elements, or it reaches the inner ring raceway continued from the larger diameter end of the guide slope surface and then is attached to the rollina surface from the inner ring raceway, whereby the rolling contact portions between the rolling surface and the inner ring raceway and the outer ring raceway are lubricated.

That is to say, on the guide slope surface, between the smaller diameter end and the larger diameter end adjacent to the inner ring raceway, there is not any portion like a step, oil ditch or edge where the sloping direction and/or sloping angle are suddenly varied. In other words, no portion is suddenly varied in sloping direction and sloping angle. Consequently, the lubrication oil attached to the guide slope surface is not separated fronm the guide slope surface on the way thereof even under the centrifugal force caused by rotating of the shaft, to reach the larger diameter end of this guide slope surface. Accordingly, the function that the lubrication oil is supplied through the guide slope surface to the rolling contact portion is efficiently carried out, without being prevented by the air curtain formed at both open end portions of the rolling bearing while the shaft is rotating. Accordingly, even if the shaft rotates at a high speed, most of the lubrication oil spouted from the nozzle hole reaches the rolling surface of the rolling elements. Consequently, without excessively increasing the supply amount of the lubrication oil from the lubrication oil path to the guide slope surface, very efficient lubrication is achieved.

Further, in the case of the lubrication system of the rolling bearing of the present invention, it is avoided that the outer ring spacer and the inner ring spacer, which is larger than the inner ring raceway, are inserted into the radially inner side of the outer ring. Accordingly, the PCD of the rolling bearing can be reduced to make the shaft rotate at a high speed. Furthermore, as the outer ring spacer need not be inserted into the radially inner side of the outer ring, the shape of this outer ring spacer can be simplified, and the cost of the lubrication system for the rolling bearing containing this outer ring spacer can be reduced.

Figure 5:
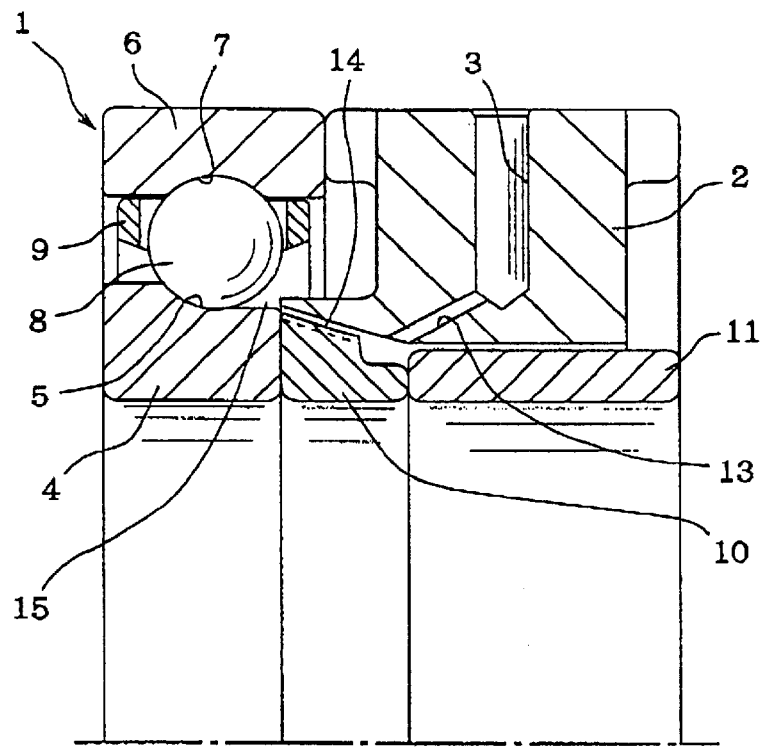
FIG. 5 is a cross sectional view of part of the rolling bearing to which an example of the conventional structure is applied.

FIG. 1 shows a first example of the embodiment of the present invention. Since the feature of the present invention is in the structure of the lubrication system for supplying lubrication oil into the space 15 where rolling elements 8 are provided between the inner peripheral surface of the outer ring 6 and the outer peripheral surface of the inner ring 4, and the other structure portions of the rolling bearing are substantially the same as the conventional structure portions mentioned above in FIG. 5, the explanation on the like structlue portions is canceled or simplified, and the feature of the present invention is explained below.

In this example of the embodiment, by making the width of the inner ring 4 in the axial direction (right and left directions in FIG. 1) smaller than that of the outer ring 6, one axial end surface of the inner ring 4 (the right end surface of FIG. 1) is located closer to the axial center of the outer ring 6 than one axial end surface of the outer ring 6. And, a first inner ring spacer 10a is provided adjacent to the inner ring 4, and a second inner ring spacer 11 is provided adjacent to this inner ring spacer 10a.

Specifically the inner peripheral surface of the first inner ring spacer 10a is cylindrically formed, and the outer peripheral surface is formed in a conical convex guide slope surface 16. On the way of this guide slope surface 16, there is not any portion that is suddenly varied in sloping direction or sloping angle like a step, oil ditch or edge, in other words, any portion at which the cross sectional profile line is not able to be differentiated. And, the whole surface of the guide slope surface 16 is smooth in surface roughness up to 0.8 $\mu$mRa. Further, the slope angle $\theta$ of the guide slope surface 16 is equal to or more than 3 degrees, so that the lubrication oil attached to this guide slope surface 16 is efficiently supplied to the inner ring 4 based on the centrifugal force. However, any excessive increase in the slope angle $\theta$ makes the thickness of the first inner ring spacer 10a in radial direction (up and down directions in FIG. 1) excessive, and the purpose of the present invention, to reduce the PCD of the rolling bearing 1, is not achieved. Then, the maximum of the slope angle is to be 30 degrees (3 degrees$\leq\theta\leq$30 degrees). For example, in FIG. 1, $\theta$ is equal to 15 degrees.

The first inner ring spacer 10a and the second inner ring spacer 11 formed in the simple cylinder shape, together with the inner ring 4, are fitted on and fixed to the main shialt (not shown) in the condition that the larger diameter end surface of the first inner ring spacer 10a (the left end surface in FIG. 1) is abutted to the smaller diameter end surface of the inner ring 4 (the right end surface in FIG. 1), and that one end surface of the second inner ring spacer 11 (the left end surface in FIG. 1) is abutted to the smaller diameter end surface of the first inner ring spacer 10a (the right end surface in FIG. 1). And, the outer diameter of the larger diameter end of the first inner ring spacer 10a (the left end in FIG. 1) is nearly equal to the outer diameter of the smaller diameter end of the inner ring 4 to which the larger diameter end is abutted. And, the axial dimension of this inner ring 4 is limited in order that the abutted surfaces of those first inner ring spacer 10a and inner ring 4 exist on the radially inside of the rolling elements 8.

On the other hand, an outer ring spacer 2a is provided adjacent to the outer ring 6 and has a cylindrical outer peripheral surface and an inner peripheral surface comprising a cone shaped concave surface 17 and a cylindrical surface 18. The cone shaped concave surface 17 of the inner peripheral surface of the outer ring spacer 2a is, in the condition of assembling the llibrication system for the rolling bearing, located on the radially outside of a half on the side of the smaller diameter end of the first inner ring spacer 10a (the right half in FIG. 1), and slopes in the radially outer direction toward the inner ring 4. And, the cylindrical surface 18 is located on the radially outside of the second inner ring spacer 11.

The diameter of the inner peripheral surface of the outer ring spacer 2a is a little larger than the diameter of the outer peripheral surface of the first and second inner ring spacers 10a, 11 at the corresponding portion in the axial direction. Accordingly, between the guide slope surface 16 that is in the outer peripheral surface of the first inner ring spacer 10a, and the cone shaped concave surface 17 that is in the inner peripheral surface of the outer ring spacer 2a, the oil supplying gap 19 is formed, so that the lubrication oil freely flows. The oil supplying gap 19 a slopes in the radially outer direction toward the smaller diameter end surface of the inner ring 4. The thickness $T_{19}$ of the oil supplying gap 19 is optional, but for the purpose of smooth supplying of the lubrication oil into the rolling bearing 1 along the guide slope surface 16, the thickness $T_{19}$ is preferred to be small, specifically in the range from about 0.1 to about 2 mm.

Further, between the cylindrical surface 18 that is in the inner peripheral surface of the outer ring spacer 2a and the outer peripheral surface of the second inner ring spacer 11, a cylindrical gap exists, but this gap is required only for the purpose of preventing the outer ring spacer 2a and the second inner ring spacer 11 from interfering each other, and not for the lubrication. Accordingly, the thickness is desired to be as small as possible.

Further, an oil supplying path 20 for supplying the lubrication oil to the oil supplying gap 19 is provided within the outer ring spacer 2a. In the condition of assembling the lubrication system for the rolling bearing, the opening of the base end portion of this oil supplying path 20 (the upper end of FIG. 1) is aligned with the opening of the oil supplying path (not shown) which opens in the inner peripheral surface of the support hole of the housing (not shown) wherein the main shaft is supported. And, the nozzle hole 21 has a tip opening which is provided at the tip of the lubrication oil supplying path 20 (the left end portion in FIG. 1) to face the medium portino of the guid slope surface 16.

In operating a machine tool having the main shaft, the lubrication oil is freely spouted from the oil supplying path 20, at the center of the guide slope surface 16 through the nozzle hole 21. Further, the nozzle hole 21 is tilted in the direction to the larger diameter side of the guide slope surface 16. Accordingly, the lubrication oil spouted from this nozzle hole 21 tends to move in the direction to the larger diameter side of this guide slope surface 21, which is augmented by its spouting energy.

By the lubrication system for the rolling bearing of the present invention as constructed above, when the main shaft (not shown) lotates correspondingly to the machine tool operation, an enough amount of lubrication oil can be supplied between the inner peripheral surface of the outer ring 6 and the outer peripheral surface of the inner ring 4 mi the rolling bearing 1, and specifically in a space 15 where a plurality of rolling elements 8 are provided. That is to say, when the main shaft (not shown) rotates, the lubrication oil supplied into the lubrication oil path 20 and spouted from the nozzle hole 21 is blown to the guide slope surface 16 and attached to this guide slope surface 16.

Thus, the lubrication oil attached to the guide slope surface 16 is, due to the balance of the surface tension and the centrifugal force caused by the rotation of the first inner ring spacer 10a fixedly fitted on the main shaft, is supplied to the larger diameter portion of this guide slope surface 16 along the guide slope surface 16. That is to say, the lubrication oil is forced by the centrifugal force to be moved toward the radially outer side, but forced to be attached to the guide slope surface 16 by the surface tension. Then, by balancing these both forces, the lubrication oil attached to the guide slope surface 16, without being separated from the guide slope surface 16, flows to the larger diameter side of this guide slope surface 16, supplied on the radially inner side of the plurality of rolling elements 8 in the rolling bearing 1 (into the interior of the rolling bearing 1).

Then, as shown by an Arrow α in FIG. 1, the lubrication oil is blown from the larger diameter end of the guide slope surface 16 by the centrifugal force radially outward, and attached to the rolling surface of the rolling elements 8. Thus, the lubrication oil attached to the rolling surface of each of the rolling elements 8 lubricates the rolling contact portion between the rolling surface of the rolling elements 8 and the inner ring raceway 5 of the outer peripheral surface of the inner ring 4 and the outer ring raceway 7 of the inner peripheral surface of the outer ring 6.

That is to say, on the way of the guide slope surface 16 from its smaller diameter end to the larger diameter end adjacent to the inner ring raceway 5, any portion suddenly varied in sloping direction or sloping angle like a step, oil ditch or edge does not exist. Consequently, the lubrication oil attached to the guide slope surface 16, in spite of the centrifugal force caused by the main shaft rotating, without being separated from this guide slope surface 16 all the way, reaches the larger diameter end of this guide slope surface 16. Then, at the larger diameter end where the sloping direction and sloping angle suddenly changes, the lubrication oil is blown by the centrifugal force radially outward and attached to the rolling surface of rolling elements 8. Accordingly, the function to supply the lubrication oil to the rolling contact portion through this guide slope surface 16 is efficiently secured without being interfered by air curtains formed at both opening ends of the rolling bearing 1 when the main shaft rotates at a high speed. Accordingly, even if the main shaft rotates at a higher speed, most of the lubrication oil spouted from the nozzle hole 21 reaches the rolling surface of the rolling elements 8. Consequently, even if the lubrication oil is not excessively supplied from the lubrication oil path 20 to the guide slope surface 16, the lubrication is efficiently achieved.

Figure 2:
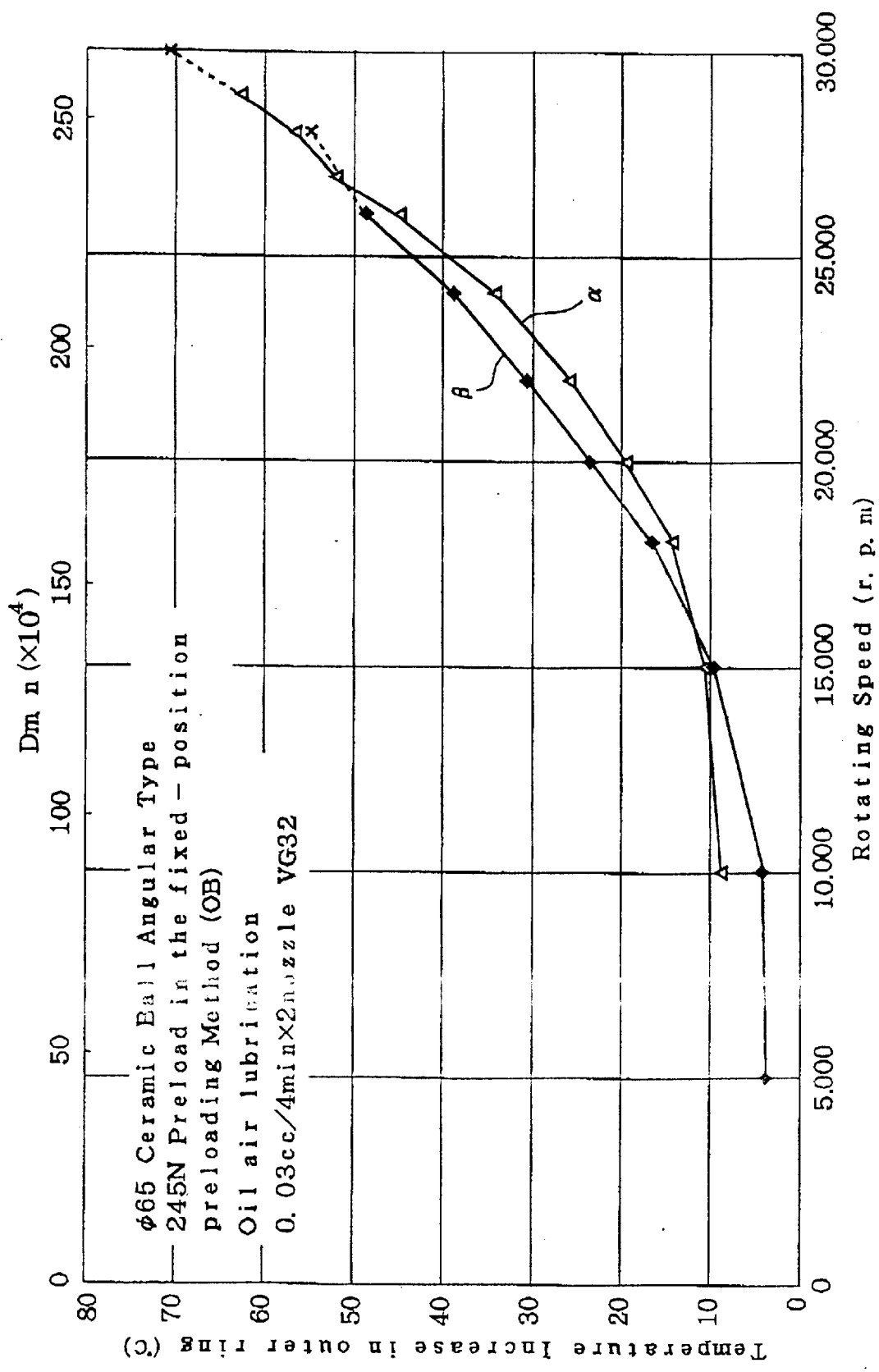
FIG. 2 is a graph to show thc results of experiments conducted to confirm the effects of the present invention.
Figure 6:
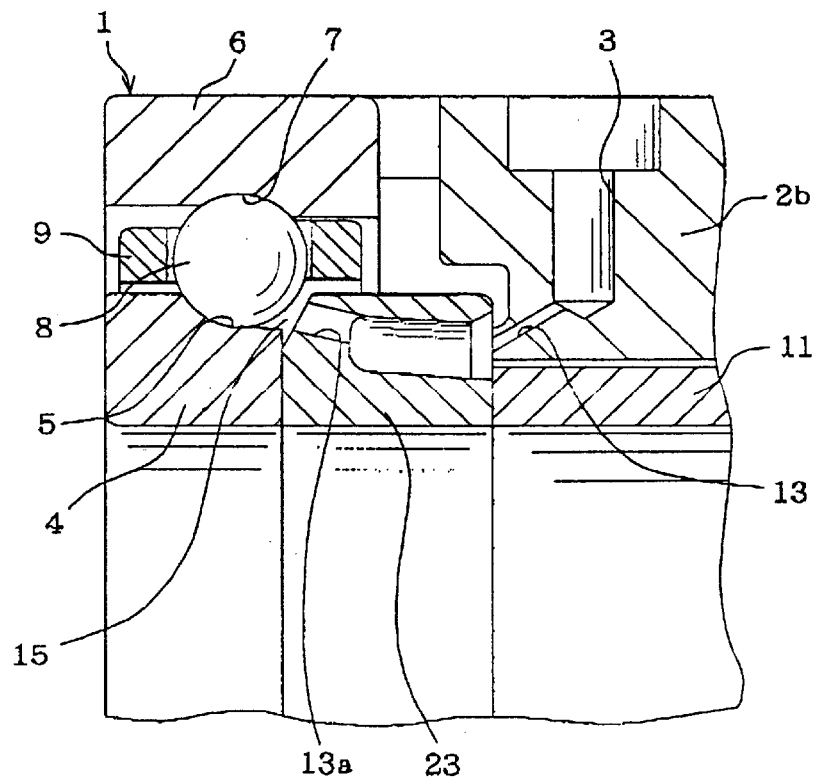
FIG. 6 is a cross sectional view of part of the rolling bearing to which another example of the conventional structure is applied.

FIG. 2 shows, the result of an experiment for confirming that the speed of the main shaft is able to be increased by the lubrication system of the rolling bearing of the present invention. In the experiment, the prior art example of the structure disclosed in the Japanese Patent Publication No. Toku Kai Hei 06-235425 shown in FIG. 6 and the first example of embodiment mentioned above are compared with each other. The rolling bearing to be lubricated is an angular type rolling bearing in the back-to-back arrangement, wherein the inner diameter of the inner ring is 65 mm and the rolling elements are ceramic balls, and pre-loaded at 245 N (25 pk kgf) in the fixed-position preloading method, where the lubrication oil corresponding to VG32 is used in a slight amount in the condition of 0.03cc/4min×2 nozzles.

In FIG. 2 showing the result of experiment under this condition, the abscissa indicates the rotating speed of the main shaft and the ordinate indicates the temperature increase of the outer ring in the rolling bearing, wherein the curve α represents the present invention while the curve β represents the prior art example, and wherein the marks x on the right end of the respective curves represent the insufficient lubrication caused to lead seizure at that time. As clear in FIG. 2 showing the result of this experiment, the present invention makes it possible, compared with the prior art structure (up tp 26,000 r.p.m. in the case of the prior structure), that the main shaft rotates at a higher speed up to 29,000 r.p.m.

Further, in the case of the lubrication system for the rolling bearing of the present invention, different from the prior art structure mentioned above, it is avoided that the outer ring spacer (FIG. 5) or the inner ring spucer (FIG. 6) having a larger diameter than the inner ring raceway enters the radially inner side of the outer ring 6. Accordingly, even if considering the prevention of interference with the other parts, the inner diameter of the retainer 9 of the rolling bearing 1 is able to be smaller enough, so that the FCD of the rolling bearing 1 can be made small and that the main shaft can be rotated at a higher speed. Moreover, because of no need for making the, outer ring spacer 2a enter the axially inner side of the outer ring 6, the form of the outer ring spacer 2a is simplified, the cost of the rolling bearing containing the outer ring spacer 2a can be reduced.

Figure 3:
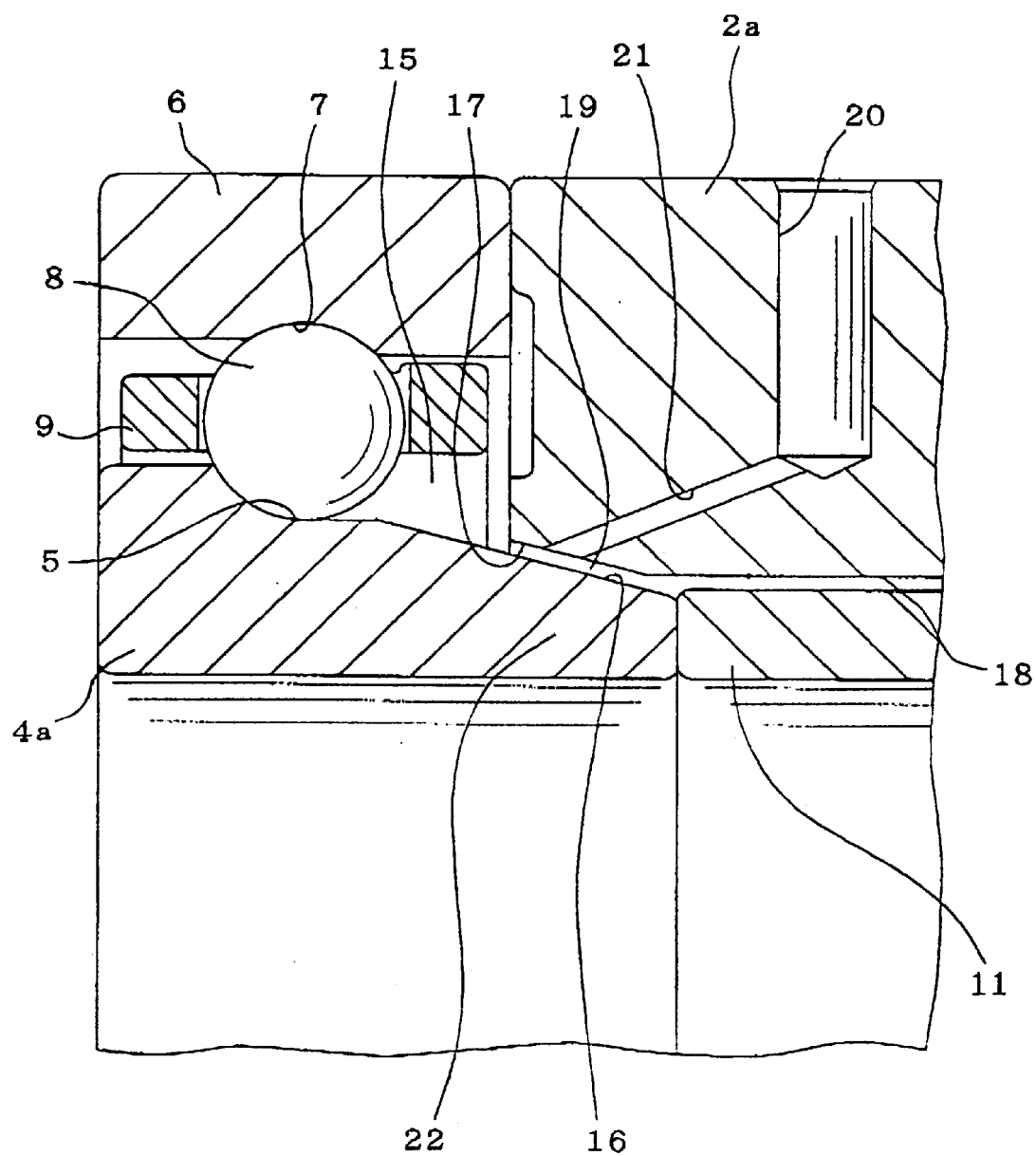
FIG. 3 is a cross sectional view of part of the rolling bearing to which another example of the embodiment of the present invention is applied.

Next, FIG. 3 shows a second example of the embodiment of the present invention. In the case of this example of embodiment, instead of canceling the first inner ring spacer 10a (FIG. 1) used in the first example of embodiment mentioned above, an extended portion 22 is formed at a half (the right half in FIG. 2) of the inner ring 4a, so that the outer peripheral surface of the extended portion 22 functions as the guide slope surface 16. Except that the extended portion 22 forming this guide slope surface 16 is united with the inner ring 4a, the structure and the function are substantially the same to those of the first example of the embodiment.

Figure 4:
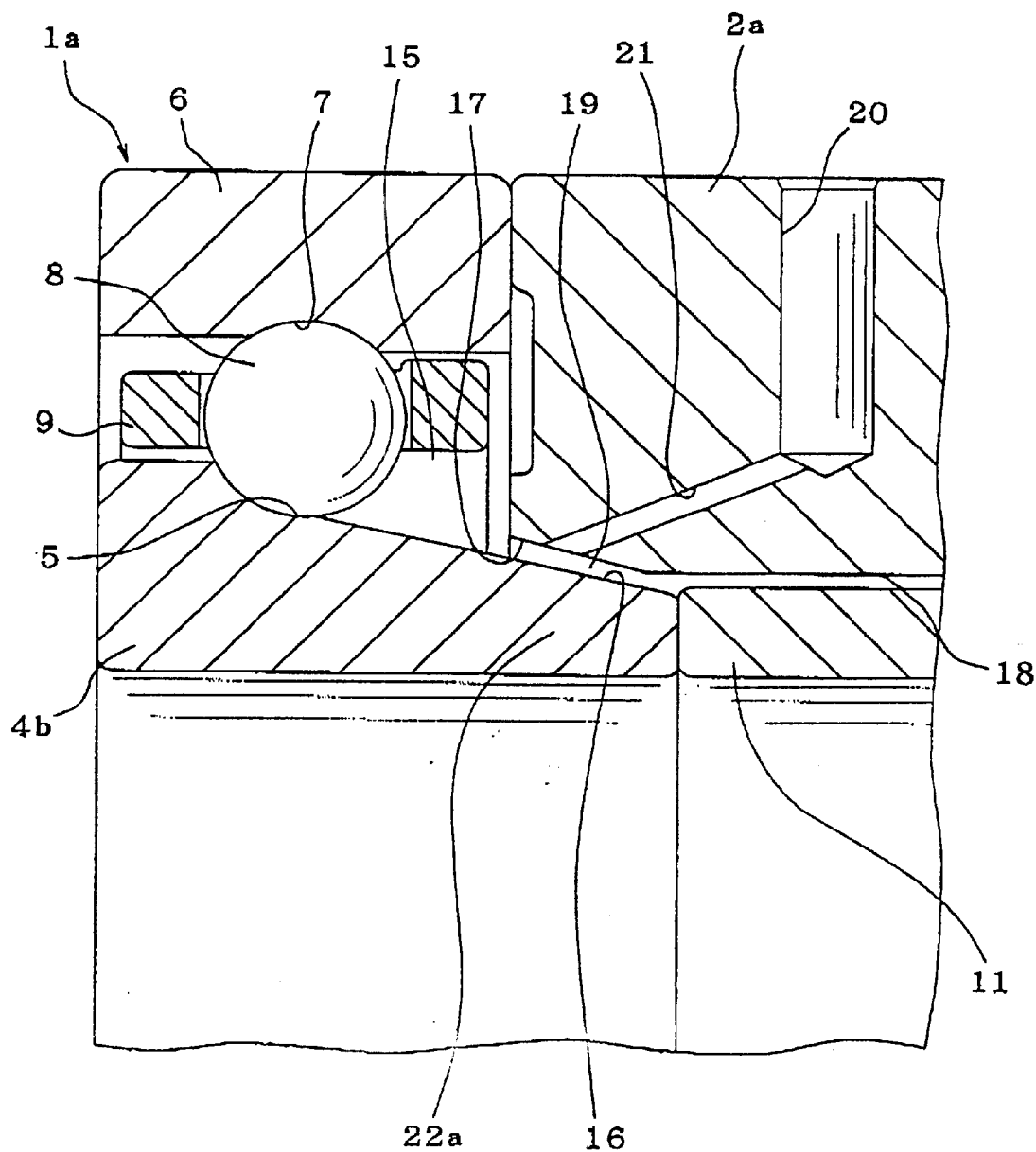
FIG. 4 is a cirs s view of part of the rolling bearing to which another example of the embodiment of the present invention is applied.

Next, FIG. 4 shows a third example of embodiment of the present invention. In the case of this example of embodiment, the guide slope surface 16 is provided on the outer peripheral surface of the extended portion 22a formed in a half (the right half in FIG. 4) of the inner ring 4b, and the larger diameter end of the guide slope surface 16 is smoothly continued to the inner ring raceway 5 provided on the outer peripheral surface of the medium portion of the inner ring 4b. Accordingly, in the case of this example of embodiment, since there is no possibility to prevent the inner ring 4b from being separated from the rolling bearing 1a being alone, it is more or less troublesome in dealing with this rolling bearing 1a. However, the lubrication oil attached to the guide slope surface 16 is supplied directly to the inner ring raceway 5, so that the lubrication of the rolling bearing 1a is efficiently conducted. The other construction and the function are substantially the same to those of the second example of the embodiment.

Further, in each of examples of the embodiment mentioned above, the cross sectional shape (generatrix shape) of the guide slope surface 16 is not necessarily linear and may be curved as in an arc shape. Essentially, it is desired that the cross sectional shape slopes in the direction that the diameter beconmes larger toward the rolling elements 8, and no portion is varied suddenly in sloping direction or sloping angle on the way. If there is a portion varied suddenly in sloping direction or sloping angle on the way, at that portion, the lubrication oil is separated from the guide slope surface based on the centrifugal force and is not supplied into the rolling bearing.

The lubrication system of the rolling bearing of the present invention is constructed and acts an mentioned above, then only by supplying a small amount of lubrication oil, the lubrication of the rolling bearing portion supporting the shaft rotating at a high speed is certainly conducted, and it is possible that the motor for rotating the shaft and the lubrication oil supplying system can be made small in size, and that the cost for operating is reduced. And, because any construction parts do not require troublesome manufacturing steps, the cost is not increased. Further, the PCD of the rolling bearing is reduced and the shaft can be rotated at a higher speed.

What is claimed is:

1. A lubrication system for a rolling bearing comprised of;
    an inner ring having an outer peripheral surface on which an inner ring raceway is formed;
    an outer ring having an end surface and an inner peripheral surface on which an outer ring raceway is formed;
    a plurality of rolling elements provided between the inner ring raceway and the outer ring raceway;
    an outer ring spacer provided adjacent to the outer ring, having an inner peripheral surface and an end and formed with a lubrication oil path,
    a guide slope surface provided with an oil supplying gap where the lubrication oil freely flows, between the inner peripheral surface of the end of the outer ring spacer and the guide slope surface, and having a small diameter end and a larger diameter end,
    wherein the guide slope surface is tilted in a direction such that the diameter thereof is decreased as it is separated from the inner ring raceway,
    wherein the guide slope surface has a smaller diameter end projected in the axially outer direction than the end surface of the outer ring to enter into the radially inner side of the outer ring spacer,
    a nozzle hole provided to open in the inner peripheral surface of the outer ring spacer to spout the lubrication oil, supplied through the lubrication oil path, into the guide slope surface, and
    wherein any portion where the sloping direction and/or sloping angle suddenly changes is excluded from the guide slope surface from the smaller diameter end to the larger diameter end.

2. The lubrication system for the rolling bearing of claim 1, wherein the guide slope surface has a surface roughness up to 0.8 μmRa.

3. The lubrication system for the rolling bearing of claim 1, wherein the guide slope surface has a tilting angle from 3 degrees to 30 degrees.

4. A lubrication system for a rolling bearing to supply lubrication oil to a rolling bearing for rotatably supporting a shaft rotating at a high speed within a housing, the system comprised of;

an inner ring fitted around and supported by the shaft within the housing and having an outer peripheral surface on which an inner ring raceway is formed;

an outer ring fitted into and supported by the housing and having an end surface and an inner peripheral surface on which an outer ring raceway is formed;

a plurality of rolling elements provided between the inner ring raceway and the outer ring raceway;

outer ring spacer provided adjacent to the outer ring, fitted into and supported by the housing, having an inner peripheral surface and an end, and formed with a lubrication oil path, an inner ring spacer provided adjacent to the inner ring, fitted around and supported by the shaft, and having an outer peripheral surface formed with a guide slope surface, the guide slope surface having a smaller diameter end and larger diameter end, an oil supplying gap provided between the inner peripheral surface of the end of the outer ring spacer and the guide slope surface of the inner ring spacer, wherein the guide slope surface is tilted in a direction such that the diameter thereof is decreased as it is separated from the inner ring raceway, wherein the guide slope surface has a smaller diameter end projected in the axially outer direction than the end surface of the outer ring to enter into the radially inner side of the outer ring spacer, and a nozzle hole provided to open in the inner peripheral surface of the outer ring spacer to spout the lubrication oil, supplied through the lubrication oil path, into the guide slope surface, and wherein any portion where the sloping direction and/or sloping angle suddenly changes is excluded from the guide slope surface from the smaller diameter end to the larger diameter end.

5. The lubrication system for the rolling bearing of claim 4, wherein the guide slope surface has a surface roughness up to 0.8 $\mu$mRa.

6. The lubrication system for the rolling bearing of claim 4, wherein the guide slope surface has a tilting angle from 3 degrees to 30 degrees.

7. A lubrication system for a rolling bearing to supply lubrication oil to a rolling bearing for rotatably supporting a shaft rotating at a high speed within a housing, th lubrication system comprised of;

all inner ring fitted around and supported by the shaft within the housing and having an outer peripheral surface on which an inner ring raceway is formed;

an outer ring fitted into and supported by the housing and having an end surface and an inner peripheral surface on which an outer ring raceway is formed;

a plurality of rolling elements provided between the inner ring raceway and the outer ring raceway;

an outer ring spacer provided adjacent to the outer ring, fitted into and supported by the housing, having an inner peripheral surface and an end, and formed with a lubrication oil path, a guide slope surface provided on the outer peripheral surface of the inner ring, and having a smaller diameter end and a larger diameter end, oil supplying gap provided between the inner peripheral surface of the end of the outer ring spacer and the guide slope surface, wherein the guide slope surface is tilted in a direction such that the diameter thereof is decreased as it is separated from the inner ring raceway, wherein the guide slope surface has a smaller diameter end projected in the axially outer direction than the end surface of the outer ring to enter into the radially inner side of the outer ring spacer, a nozzle hole provided to open in the inner peripheral surface of the outer ring spacer to spout the lubrication oil, supplied through the lubrication oil path, into the guide slope surface, and wherein any portion where the sloping direction and/or sloping angle suddenly changes is excluded from the guide slope surface from the smaller diameter end to the larger diameter end.

8. The lubrication system for the rolling bearing of claim 7, wherein the guide slope surface has a surface roughness up to 0.8 $\mu$mRa.

9. The lubrication system for the rolling bearing of claim 7, wherein the guide slope surface has a tilting angle from 3 degrees to 30 degrees.

10. The lubrication system for the rolling bearing of claim 7 wherein the large diameter end of the guide slope surface is smoothly continued to the inner ring raceway.

* * * * *